United States Patent [19]

Kim

[11] Patent Number: 4,500,052
[45] Date of Patent: Feb. 19, 1985

[54] LIQUID FUEL PREVAPORIZATION AND BACK BURNING INDUCTION JET OVAL THRUST TRANSITION TAIL PIPE

[76] Inventor: Kyusik Kim, 5026 Rhoads Ave., Santa Barbara, Calif. 93111

[21] Appl. No.: 240,619

[22] Filed: Mar. 5, 1981

[51] Int. Cl.³ .................. B64C 29/00; B64C 39/10
[52] U.S. Cl. ................................ 244/12.1; 244/36; 244/53 R; 60/269; 60/737
[58] Field of Search ............... 60/261, 264, 269, 270, 60/737, 244, 262; 244/15, 1 N, 53 R, 73 R, 74

[56] References Cited

U.S. PATENT DOCUMENTS

| 2,882,679 | 4/1959 | Karcher et al. | 60/261 |
| 2,920,445 | 1/1960 | Bailey | 60/261 |
| 3,261,571 | 7/1966 | Pinnes | 60/244 |
| 3,483,699 | 12/1969 | Harvey | 60/737 |
| 4,168,044 | 9/1979 | Rethorst | 244/1 N |
| 4,222,232 | 9/1980 | Robinson | 60/737 |

FOREIGN PATENT DOCUMENTS 636918 2/1962 Canada .................. 60/270

Primary Examiner—Galen L. Barefoot
Attorney, Agent, or Firm—Daniel J. Meaney, Jr.

[57] ABSTRACT

A liquid fuel prevaporization and backburning induction jet thrust transition tailpipe having a primary inlet adapted to be affixed to a turbojet engine and having a diverging area in the transition tailpipe formed of vertically converging and horizontally diverging walls terminating in a thrust nozzle, a pair of air plenums for directing an air/ram flow into the main airflow path having a bellmouth shaped inlet which communicates with an airflow inducing nozzle which terminates in a chamber having a downstream end opening forming a secondary inlet to the diverging area, a plurality of parallel, vertically spaced curved inductor vanes positioned in the secondary inlets and which are adapted to deflect a secondary airflow passing through the bellmouth shaped airflow inducing nozzle, chamber and secondary inlet into a path through the diverging area which is substantially directed towards the thrust nozzle, an upper and lower liquid fuel prevaporization chambers, fuel injectors, and gas outlets, a vaporized gas distributing manifold having discharge openings positioned ahead of the horizontally diverging portion of the thrust nozzle which is adapted to direct a vaporized gas flow into and to be mixed with the airstream within the diverging area and which is responsive to the airstream passing over the discharge openings to produce a vacuum within the prevaporization chambers and an ignitor positioned adjacent the discharge outlets at the vaporized gas-air mixing point which ignites the vaporized gas-air mixture such that the ignited vaporized gas-air mixture combustion occurs in the thrust nozzle is shown.

8 Claims, 22 Drawing Figures

LIQUID FUEL PREVAPORIZATION AND BACK BURNING INDUCTION JET OVAL THRUST TRANSITION TAIL PIPE

BACKGROUND OF THE INVENTION

1. Field of the Invention

This invention relates to the propulsion system of an aircraft. It utilizes the liquid fuel prevaporization and back burning induction jet oval thrust nozzle which fits on the exit nozzle of a conventional turbojet engine, enveloped with ram constriction air inlet plenum-engine pod, installed forward of aerodynamic generating channel, located forward/above the vacuum cell induction lift wing and below the recycling air inductor vanes.

2. Description of the Prior Art

Tail pipes having round engine exit nozzles adapted to be affixed to the exit nozzle of conventional turbojet engines are known in the art.

SUMMARY OF THE PRESENT INVENTION

Round engine exit nozzle transition to vertically converging with horizontally diverging oval thrust nozzle, which is constructed with main airflow inducing nozzles, fuel injecting airflow inducing nozzles, combustion chambers, inductor vanes, liquid fuel prevaporization chambers, vaporized gas distributing manifolds with discharge nozzles, fuel injectors, ignitors and envelope of plenum. The air intake bellmouths of airflow inducing nozzles are installed inside the ram constriction air inlet plenums which are in empty spaces in the engine pod on both sides of engine. The throat downstream of airflow inducing nozzles are diverged with combine into the combustion chamber. The downstream ends of combustion chambers are connected on both sides minor axes span of round to oval transition tail pipe and connected with parallel vertical equally spaced and downstreamwardly curved inductor vanes. Hollow spaces between plenum wall and the flat span of transition walls comprises the vaporization chambers fitted with fuel injecting sprays and vaporized gas distributing manifolds with discharge nozzles. The discharge nozzles are downstreamwardly inclined and connected on minor axes span areas of oval thrust nozzle. Openings of inclined discharge nozzles are adequate for the slipflow of thrust stream and are positioned slightly upstream from throat of oval thrust nozzle for accommodation of ignition time span and to process the temperature reactants of back firing combustion at downstream of oval thrust nozzle. The dynamic pressure of turbo-jet engine exhaust stream slipflows over the inductor vanes and induces induction air flowing from plenums through the airflow inducing nozzles, resulting in increased airstream volume at the oval thrust nozzle, this processing of turbo-induction jet air breathing is operative when the aircraft is on the ground with engine idling, during low speed or deceleration of flight.

When the processing of induction jet air breathing stream gain liquid fuel prevaporizations and ignitions which is produces the flame thrust at downstream of oval thrust nozzle and expansion through the diverging contour of aerodynamic generating channel. The dynamic pressure of the flame thrust stream induces streams of air from surrounding air through the slot gap between the flat span of oval thrust nozzle and the leading edge of wing, and the recycles airstream at forward upper portion of aerodynamic generating channel through the reverse flow duct from peripheral flow of rarefied thrust. These airstreams are merged with flame thrust, then produces the expanding combustion thrust stream in the diverging contour of aerodynamic generating channel over the vacuum cell induction lift wing. The dynamic pressure of expanding combustion thrust stream slipflows over the downstreamwardly inclined slot openings of vacuum cell wing. This stream action on the wing induces the vacuums in internal cells of wing which creates aerodynamic lift and drag forces on the wing, these forces are corresponding with the incidence angle of wing which angle from center-line of thrust stream and wing chord line, these forces generating on the wing results in the drag force counteract the forward thrust of engine and stabilizer the horizontal moment of airframe, and the lift force balances the weight of aircraft where hovering capacity is producted which is accomplished by the turbo-induction jet air breathing rocket thrust aerodynamic generating channel. Forward speed of aircraft generates additional lift force on the airfoil shaped airframe, this additional lift force correspond to reducing of incidence angle of wing which means reduction of drag force on the vacuum cell wing, this permit the forward acceleration from hovering to hypersonic flight which is accomplished by operation of liquid fuel prevaporization and back burning induction jet oval thrust nozzle.

Ram constriction air inlet plenums gain ram-static pressure when the aircraft is in high speed flight, plenum's airstream through the airflow inducing nozzles and flow into the oval thrust nozzle, when turned on fuel injections at downstream throat of fuel injecting airflow inducing nozzles, the combustible mixture is ignited it produces flame stream and flows combine into downstreams of main airflow inducing nozzles which entering of combustion chamber, expanding combustion streams producted the ramjets through diverging contours of combustion chambers and expansion of ramjets streams combined with turbojet stream at oval thrust nozzle, which means an oval thrust nozzle handling the turbojet stream and the ramjets streams, thus creating a turbo-ram induction jet air breathing engine, processed by the principle of free stream constriction air intake which oblique streams flow tangentially toward interaction together with constriction to critical pressure and form the free stream throat inside the low velocity air plenums, resulting in first constrained then expansion of ram-airstream which controls the ram pressure on air intake bellmouths of ram-airflow inducing nozzles which are ramjet components of the induction jet oval thrust nozzle, this processing of the turbo-ram induction jet air breathing oval thrust stream is operated when the aircraft is in supersonic flight.

When the processing of turbo-ram induction jet air breathing oval thrust stream receives the injection of liquid fuel prevaporization and ignition, produces the flame thrust stream at downstream of oval thrust nozzle in the forward section of aerodynamic generating channel, the dynamic pressure of back burning oval thrust stream induces the recycles airstream which is thrust peripheral flows diverts into the forward and upper portion of channel through the reverse flow duct and recycling inductor vanes. Forward speeding leading edge of wing induces oblique shock airstream and interact with flame stream of turbo-ram induction jet air breathing rocket thrust, these streams are tangentially constriction to critical pressure and form the high velocity free stream throat in the forward section of channel, these streams are merged with produces the expanding combustion from downstream of free stream throat and expansion to hypersonic velocity of thrust stream in the diverging contours of channel which is accomplished by the turbo-ram induction jet air breathing rocket thrust aerodynamic generating channel.

The liquid fuel prevaporization and back burning induction jet oval thrust nozzle fitted on the round exit pipe of conventional ram-axialflow turbine with enveloped ram constriction air inlet plenum and installed ram-stream zone of airframe, the ram-axialflow turbine is operated during high speed flight and fuel injectors in the ram-airflow inducing nozzles are activated with combustible mixture is ignited and produces the ramjets at downstream of airflow inducing nozzles in the combustion chambers, expanding ramjets streams slipflows over the exit pipe of axialflow turbine and induces the negative pressure region at turbine downstream, resulting in increased pressure differential on the turbine inlet and outlet, this enhanced power of ram-axialflow turbine and operates such of electric generator, thus achieved a means of the ramjet-induction axialflow turbine which is accomplished by the liquid fuel prevaporization and back burning induction jet oval thrust nozzle fitted onto the conventional axialflow turbine. When the ramjet induction axialflow turbine thrust stream receives the prevaporized liquid fuel at throat of ramjet induction oval thrust nozzle and is ignited, hypersonic flame thrust is produced which provides the capacity to auxiliary power for special order of hypersonic flight with generate high capacity electricity for power supply of future developments.

The liquid fuel prevaporization and back burning induction jet oval thrust nozzle is consist in technical feasibility of conventional air breathing engine conversion to multi-stage power plant of induction jet air breathing engine and principal new method of induction lift aircraft. The multi-stage power plant of air breathing is management of fuel injection as described in previously, and processed by the principles of induction and free stream constriction, which induction is freedom balancing beyond-dynamic pressure of thermal thrust stream on diverging contours of transition tail pipe and aerodynamic generating channel, and which free stream constriction is oblique streams tangentially interact toward with constriction to critical pressure and form the free stream throat which free stream shaping action of constriction and expansion on the air intake of low velocity air plenums and the thrust stream in the aerodynamic generating channel. The power plant stages are summarized below:

Stage 1: Turbo-induction jet air breathing engine.

Stage 2: Turbo-induction jet air breathing rocket engine.

Stage 3: Turbo-ram induction jet air breathing engine.

Stage 4: Turbo-ram induction jet air breathing rocket engine.

This invention is described in accompanying drawings which are:

FIG. 1 is a plan view of liquid fuel prevaporization induction jet oval thrust nozzle which is slip fit on the conventional turbojet engine 1, showing round engine exit nozzle 2 transition to horizontally divergent major axes of oval thrust nozzle 3, fabricated with main airflow inducing nozzle 4, fuel injecting airflow inducing nozzles 5 fitted with fuel injectors 6 and ignitors 7, combustion chambers 8, inductor vanes 9, liquid fuel prevaporization chambers 10 fitted with fuel injecting sprays 11, vaporized gas distributing manifolds 12 with discharge nozzles 13 fitted with ignitors 14, and plenum envelope 15.

FIG. 2 is a side view of FIG. 1, showing round engine exit nozzle 2 transition to vertically convergent minor axes of oval thrust nozzle 3.

FIG. 3 is a cross section of FIGS. 1 and 2, showing throat of airflow inducing nozzles 4 and 5, and are installed inside the low velocity air plenums 16, located both sides of conventional air breathing engine 1.

FIG. 4 is a cross section at throat of oval thrust nozzle, showing liquid fuel prevaporization chambers 10 fit on the flat span areas of oval thrust transition tail pipe, vaporized gas distributing manifolds 12 with discharge nozzles 13, and inductor vanes 9.

FIG. 5 is a plan view of induction jet air breathing power plant, conventional turbojet engine 1 installed center-line portion of air plenum-engine pod, liquid fuel prevaporization and back burning induction jet oval thrust nozzle is fitted on the engine exit nozzle 2 and enveloped with rear portion of plenum, forward of plenum is inclined air intake opening fitted with multiple-bendable vanes, shows rigidly fixed straight vanes 17, fixed forward section of vanes 18 and deflectable trailing section of vanes 19.

FIG. 6 is a side view of FIG. 5, showing inclined air intake of plenum fitted with fixed forward section of vanes 18 and deflectable trailing section of vanes 19, airflow inducing nozzles 4 and 5, liquid fuel prevaporization chambers 10, and vaporized gas distributing manifolds 12 with discharge nozzles 13.

FIG. 7 is a partial plan view of ram constriction air inlet plenum, showing rigidly fixed straight vanes 17 located center-zone of low velocity air plenum, deflectable trailing section of vanes 19 are hinged with forward rigid section of vanes 18, the trailing section of vanes are deflected toward rigidly fixed straight vanes 17 during high speed flight, inflect and constrained the ram-stream at center-zone of low velocity air plenums 16, the shaping action of converging stream 20 constriction to critical pressure zone 21 which forms free stream throat, then expanding divergent stream 22 flow into the plenums 16, also shows the ram pressure gradiant 23 and 24 on front of air intake openings.

FIG. 8 is a plan view of aerodynamic generating channel, showing the forward of channel is oval thrust nozzle 3, floor of channel is vacuum cell induction lift wing 25, the wing is mounted on the walls of channel with fixed centering bearing 26 and drivable bearing 27, drivable bearings are linked with hydraulic actuators 28.

FIG. 9 is a longitudinal section of aerodynamic generating channel, upper portion of channel is reverse flow duct 29 of thrust stream peripheral flow, diverting flow turning vanes 30 at rear end and recycling air inductor vanes 31 at forward end of the reverse flow duct, turning vanes are linked with hydraulic actuators 32, floor of channel is vacuum cell induction lift wing 25, showing acoustically treated hollow of airfoil provided airtight partitions 33 which are divided into cells 34 and top panel of airfoil provided downstreamwardly inclined slot openings 35 which adequate for slipflow of airstream.

FIG. 10 is a side elevation of induction lift aircraft, showing the turbo-induction jet air breathing power plant 36 mounted on airframe at forward of aerodynamic generating channel, and ramjet induction axialflow turbine electric generator 37 mounted on rear portion of airframe, shows oblique shock streams 75 induced by forward speeding outriggers 76, these oblique streams interaction with flame thrust stream, these streams are tangentially toward constriction to critical pressure which forms free stream throat 77 then expanding combustion thrust stream 78 at downstream of free stream throat.

FIG. 11 is a longitudinal section view of induction lift flying saucer, turbo induction jet oval thrust nozzle is mounted on forward of aerodynamic generating channel, floor of channel is variable incidence angle drivable mounted vacuum cell induction lift wing 25, and ceiling of channel is jet thrust peripheral flow recycling system 29, 30 and 31.

FIG. 12 is a schematic of turbo induction jet air breathing, when the aircraft is operated in neutral position, low speed or deceleration of flight, wide open the air intake vanes, showing turbo-induction jet stream as it passes through the oval thrust induction tail pipe, engine jet stream 38, induction airflowing stream 39, and boundary layers 40, the boundary layers are exists near the inductor vanes 9.

FIG. 13 is a schematic showing the air distribution of turbo-induction jet air breathing thrust stream in the aerodynamic generating channel, when the aircraft operated in neutral position, low speed or deceleration of flight, shows peripheral flow recycling airstream 42, 43 and 44, surrounding sirstream 45, the recycling and surrounding airstreams are induced by dynamic pressure of oval thrust stream 41, resulting in increased airstream volume which merged airstream 46 flow over the extreme incidence angle 47 of vacuum cell induction lift wing which angle between the center-line of thrust strem 48 and wing chord line 49, recirculating peripheral flow of thrust stream which forms thermal stream tire against airstream in the aerodynamic generating channel, this achieved the energy conservation of aerodynamic system from waste downstream peripheral flow recycling into forward of aerodynamic generating channel.

FIG. 14 is a schematic of turbo-rocket induction jet air breathing, when the aircraft is operated in VTOL., hovering capacity or momentum acceleration from hovering to forward speed, turn-on the liquid fuel prevaporizations, vaporized gas discharge stream 52 flow into induction airstream zones of oval thrust nozzle, ignite the combustible mixture 53 and process flame thrust stream 54 at downstream of oval thrust nozzle.

FIG. 15 is a schematic showing the distribution of turbo-induction jetrocket air breathing thrust stream in the aerodynamic generating channel, when the aircraft is operated in maximum hovering capacity with extreme incidence angle of wing, the dynamic pressure of flame thrust 54 induces recycling stream 44 and surrounding airstream 45, these streams are merged with flame thrust and produces expanding combustion thrust stream 55, the dynamic pressure of expanding combustion thrust stream flow over the vacuum cell wing 25 induces cavitations internal cells of wing and generated high capacity aerodynamic lift 50' and drag 51' forces. The drag force on the wing is counterbalances the forward thrust of engine and stabilizing the horizontal moment of airframe, and the lift force on the wing is balances the weight of aircraft which is hovering capacity.

FIG. 16 is a schematic of turbo-ram induction jet air breathing, when the aircraft is operated in supersonic flight, deflected air inlet vanes, showing ram streams constriction and forms free stream throat 21, then expanding stream flow into and gain the static pressure inside the low velocity air plenums 16, ram pressure gain on the bellmouths of induction airflow inducing nozzles 4 and 5, generated high velocity airstreams through the throats of aiflow inducing nozzles with fuel injections 56 and ignite 57 the combustible mixture 58, produces flame stream 59 and combine into engine jet stream at the oval thrust nozzle 3 through the inductor vanes 9, the boundary layers 40' are shifted toward center-line of engine jet stream 38.

FIG. 17 is a schematic showing the distrbution of turbo-ram induction jet air breathing thrust stream in the aerodynamic generating channel, when the aircraft operated in supersonic flight, the dynamic pressure of thrust stream induces recycling airstream 44 from peripheral flow of thrust rarefied, forward speeding leading edge 60 of wing induces oblique shock airstream 61, these streams are merged with turbo-ram induction jet thrust stream and these streams are tangentially toward interaction with constriction to critical pressure which forms free stream throat 62, then expanding thrust stream 63 at downstream of free stream throat in the diverging contour of aerodynamic generating channel.

FIG. 18 is a schematic of turbo-ram induction jet rocket air breathing, when the aircraft is operated in hypersonic flight, turn-on the fuel injections on ramjets and prevaporizations, vaporized gas discharge stream 52 ignited combustible mixture 53 and combined with ramjets stream 59 at throat of oval thrust nozzle, generated the flame thrust 64 at throat downstream of oval thrust nozzle.

FIG. 19 is a schematic showing the distribution of turbo-ram induction jet air breathing rocket thrust stream in the aerodynamic generating channel, when the aircraft operated in hypersonic flight, dynamic pressure of flame thrust stream 64 induces recycles airstream 44 at forward upper portion of channel, forward speeding leading edge 60 of wing induces oblique shock stream 61, these streams are merged with flame thrust stream, tangentially interact with constriction to critical pressure which form the free stream throat 65, produces expanding combustion thrust stream 66 at downstream of free stream throat in the diverging contour of aerodynamic generating channel.

FIG. 20 is a plan view of liquid fuel prevaporization and back burning induction jet oval thrust nozzle fitted on the round exit pipe 67 of conventional axialflow turbine (rotators 68 and 70, stators 69), electric generator 71, generator is installed inside the turbine exhaust pipe 72, and enveloped with ram constriction air inlet plenum 16.

FIG. 21 is a schematic showing air distribution of ramjet induction axialflow turbine, when the aircraft is in supersonic flight, ramjets streams 59 expanding into the oval thrust nozzle through the inductor vanes 9, induces the negative pressure stream 73 inside the exhaust pipe of axialflow turbine, this increases pressure differential between turbine inlet and outlet.

FIG. 22 is a schematic showing air breathing of ramjet induction axialflow turbine exhaust stream receives liquid fuel prevaporization and produces flame thrust stream 74 at downstream of oval thrust nozzle, during hypersonic flight.

DESCRIPTION OF THE PREFERRED EMBODIMENT

The outside shape of power plant is comprised by envelope of low velocity air plenum-engine pod, which is multiple vanes are fitted on the inclined air intake opening at forward of plenum, the induction jet oval thrust transition tail pipe is fitted on the rear end of plenum, and conventinal turbojet engine is installed inside of and center-line portion of plenum.

Figure 1:
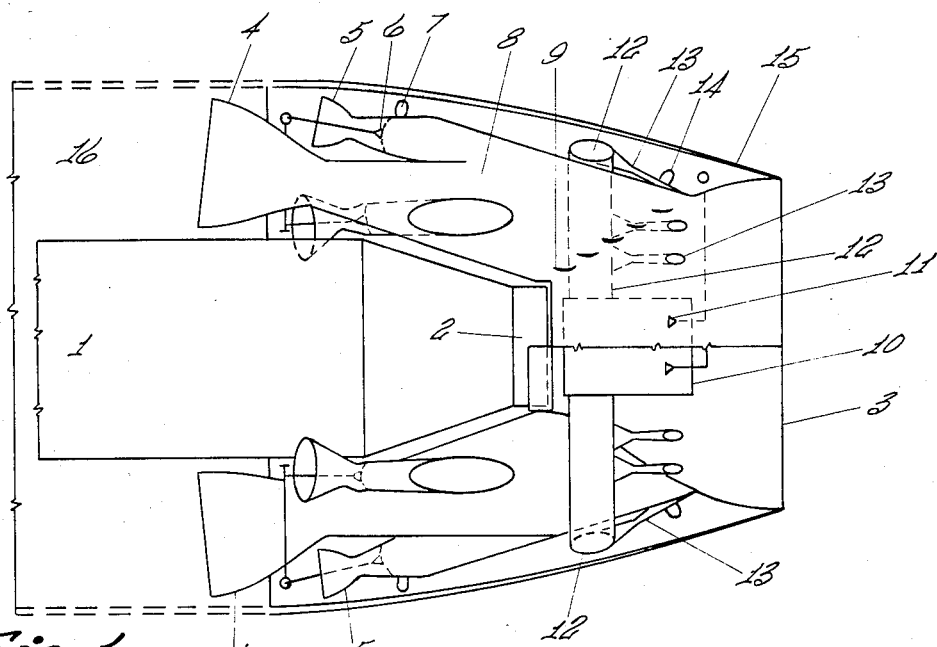
Figure 2:
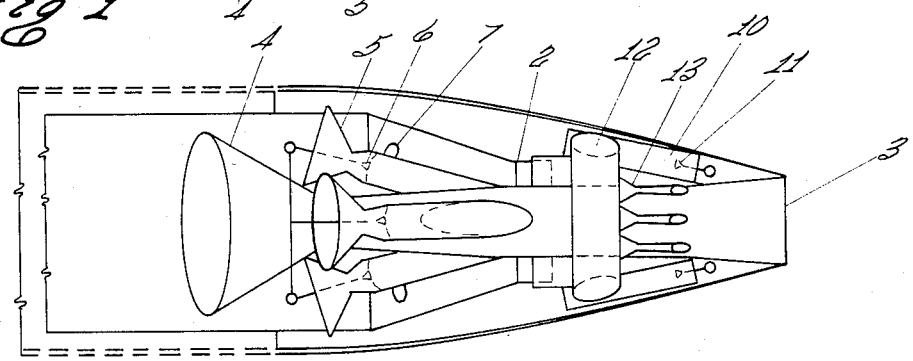
Figure 3:
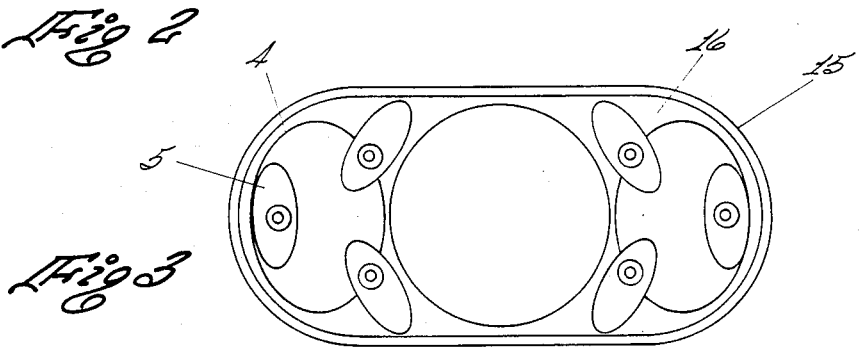
Figure 4:
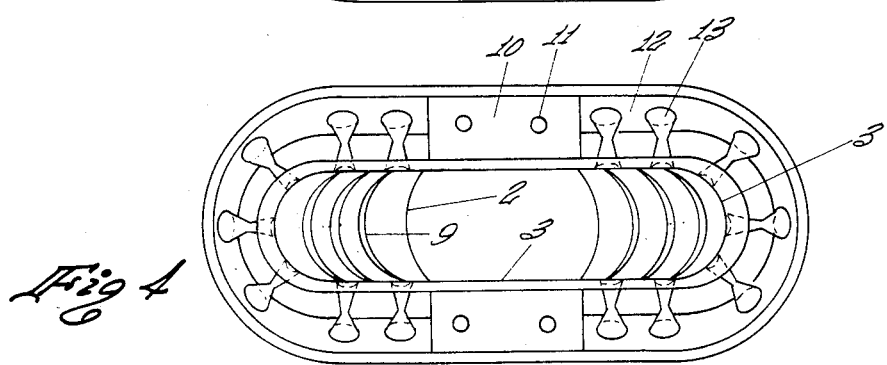
Figure 5:
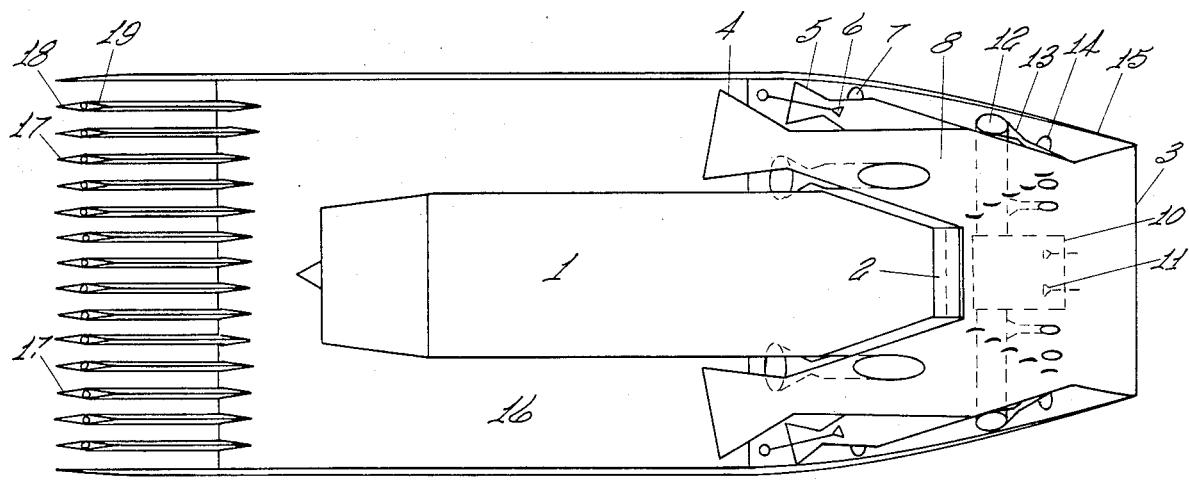
Figure 6:
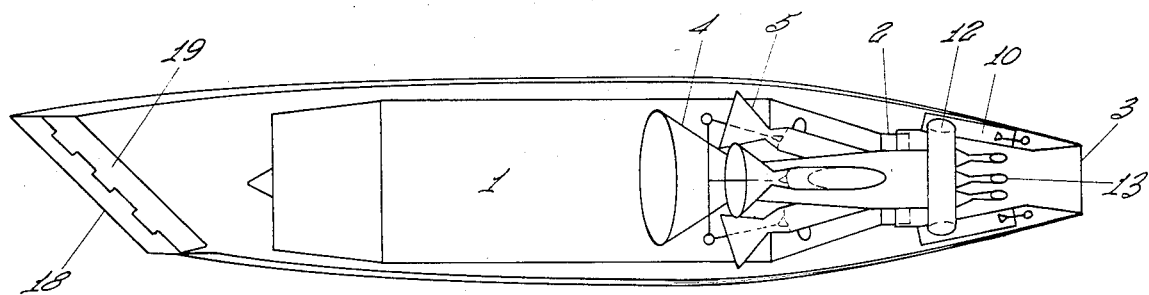
Figure 7:
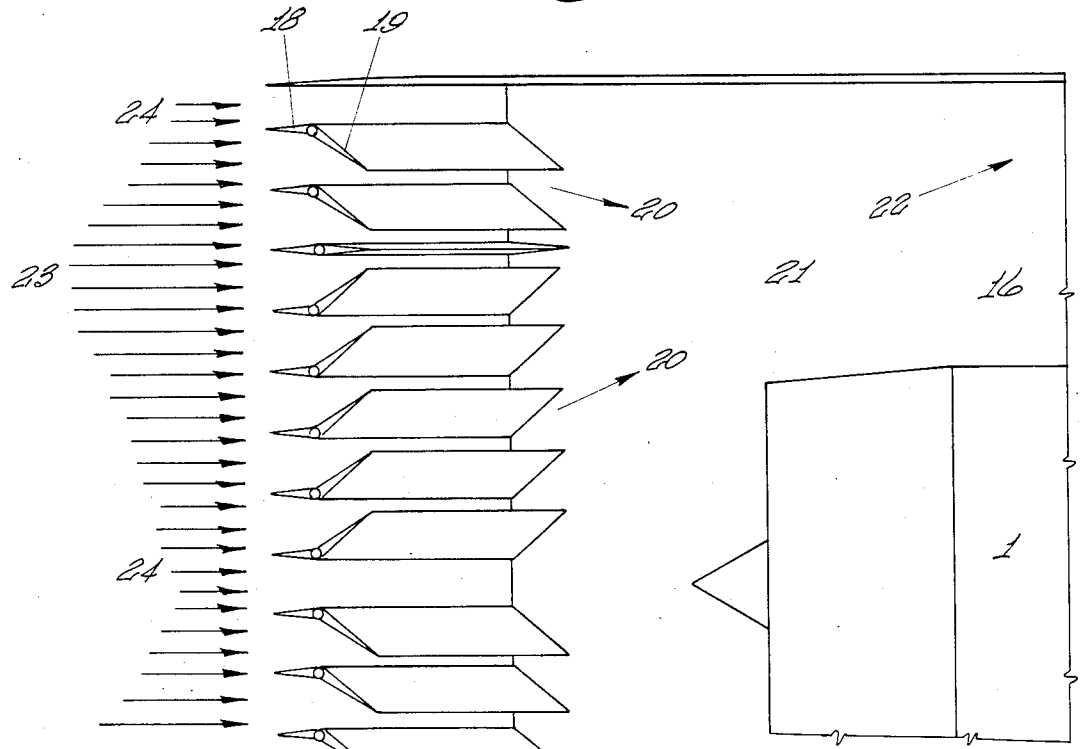
Figure 8:
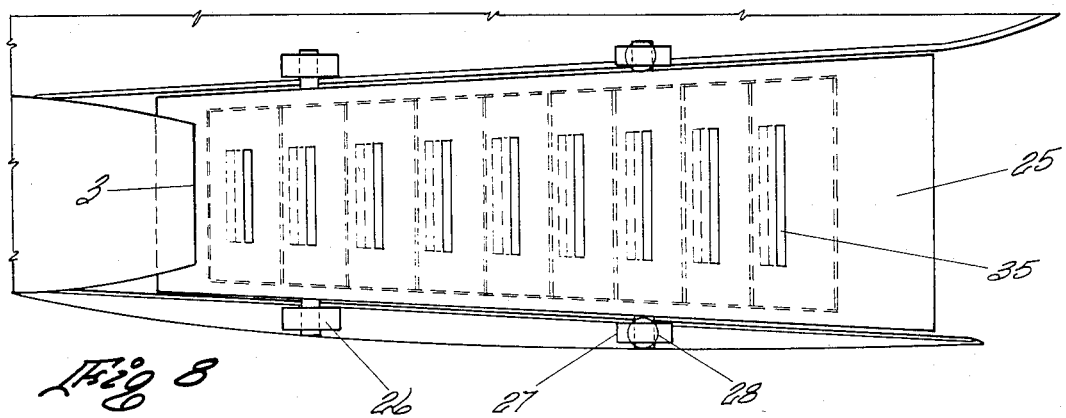
Figure 9:
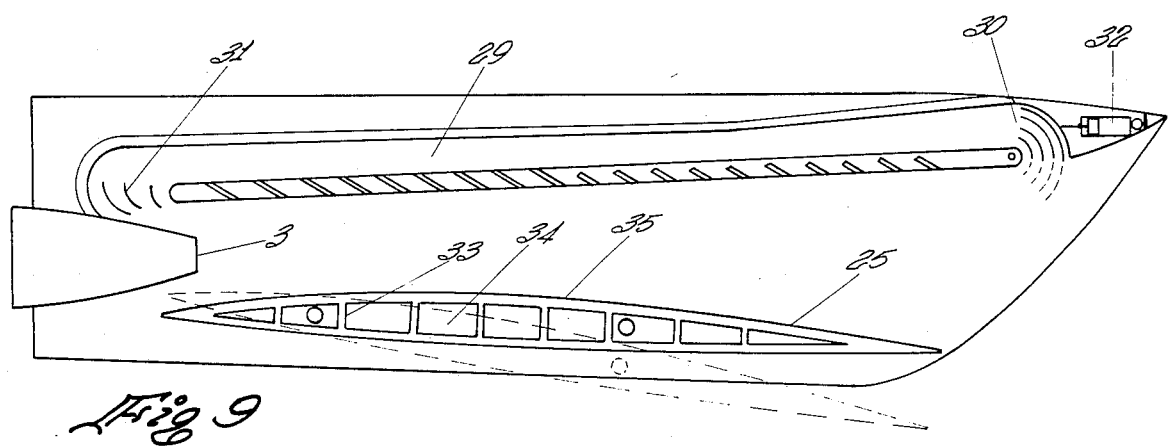
Figure 10:
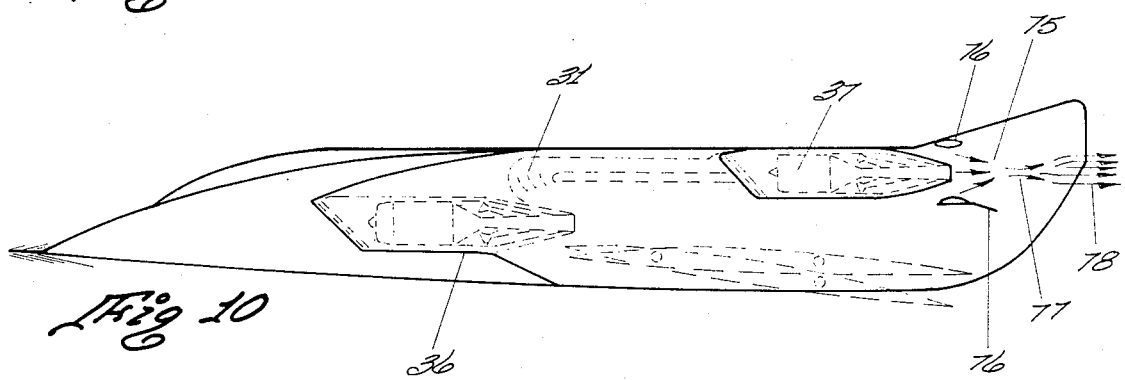
Figure 11:
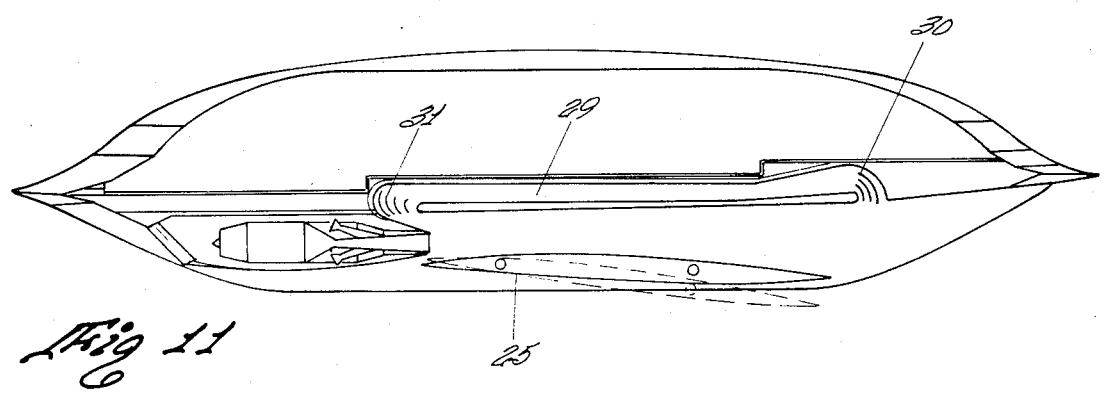

The air inlet of ram constriction system is illustrated in FIGS. 5, 6 and 7. Multiple inflective vertical vanes assembly is fitted on the inclined opening at forward of low velocity air plenum-engine pod. The vanes are fabricated with rigidly fixed straight vanes 17 and are positioned center-zones of low velocity air plenums 16 where empty spaces on both sides of engine 1. Deflectable trailing section of vanes 19 are hinged with rigidly fixed forward section of vanes 18 and are equally spaced with divided from rigidly fixed straight vanes 17. The deflectable trailing section of vanes 19 are linked with conventional hydraulic actuators for adjust the position of vanes such of close or open. Deflectable vanes 19 are positioned straightly and parallel with the rigidly fixed straight vanes 17 which means wide open the air intake, illustrated in FIGS. 12 and 14, this position of vane action is applies when the aircraft is in stationary or low speed and deceleration of flight. Deflect the trailing section of vanes 19 bent toward on both sides of rigidly fixed straigh vanes 17, operated by hydraulic actuator, illustrated in FIGS. 16 and 18, this position of vane actions are applies when the aircraft is in high speed flight. The shaping action of ram-stream inside the low velocity air plenums are illustrated in FIG. 7, when deflect the trailing section of vanes 19 bent and toward to rigidly fixed straight vanes 17 where positioned center-line zone of low velocity air plenums, during supersonic flight. Impact of ram-stream on the rigidly fixed forward section of vanes 18, then the airstreams restricted and inflected by trailing section of vanes 19, the stream flow directions are inflected with produces oblique streams 20 and these streams are tangentially constrained toward center-line zone of low velocity air plenums 16. The shaping action of ram constriction resulting in ram-stream constriction to critical pressure which form the free stream throat 21 and controls the stream pressure which is achieved purpose of ram stream constriction system for controls of ram-air volume and ram-pressure inside the low velocity air plenums 16, and reduces ram dynamic drag force on the engine suction diffuser during high speed flight. Reduces the ram drag force on the front of air intake opening, this caused by variable ram back pressure gradient on downstream of vanes where the center zones of ram constriction portion has more pressure drag force 23 on front of vanes and less pressure drag force 24 on front of engine suction and both sides of air separation zones on downstream of vanes. Ram drag force on front of vanes which is ram pressure exceed than critical pressure on downstream of vanes, this resulting in the pressure drag dynamic slip-down on the inclined face of air intake which is reduction of ram drag force on the front of air intake opening. Ram stream constrictions are enhanced the ram static pressure inside the low velocity air plenums, increasing of ram static pressure inside the low velocity air plenums are enhanced efficiency of ramjets on the ram-axialflow inducing nozzles 4 and 5 of turbo-induction jet air breathing engine.

Figure 20:
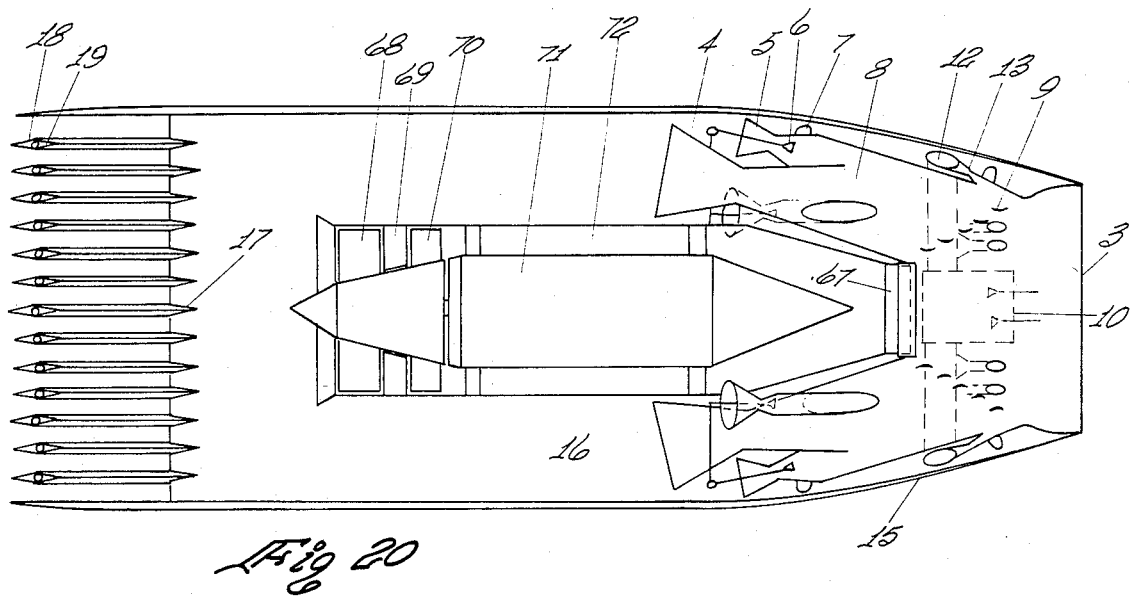
Figure 21:
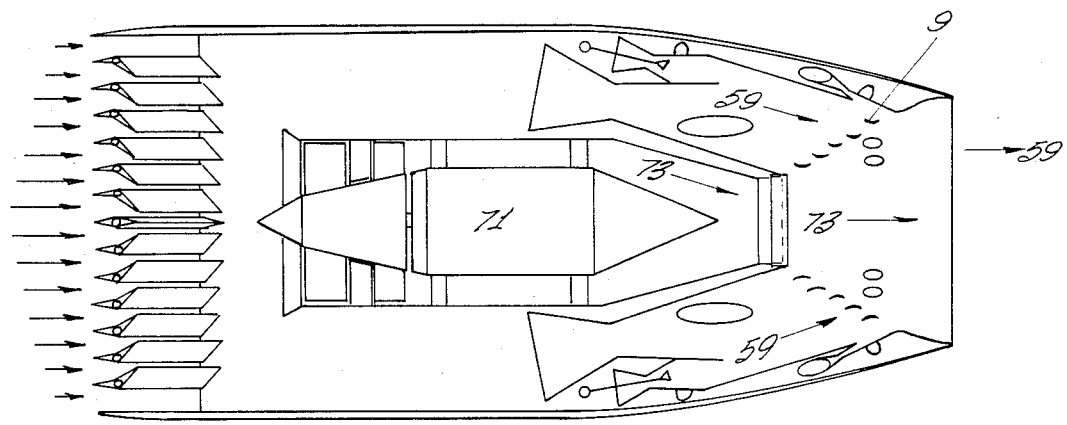
Figure 22:
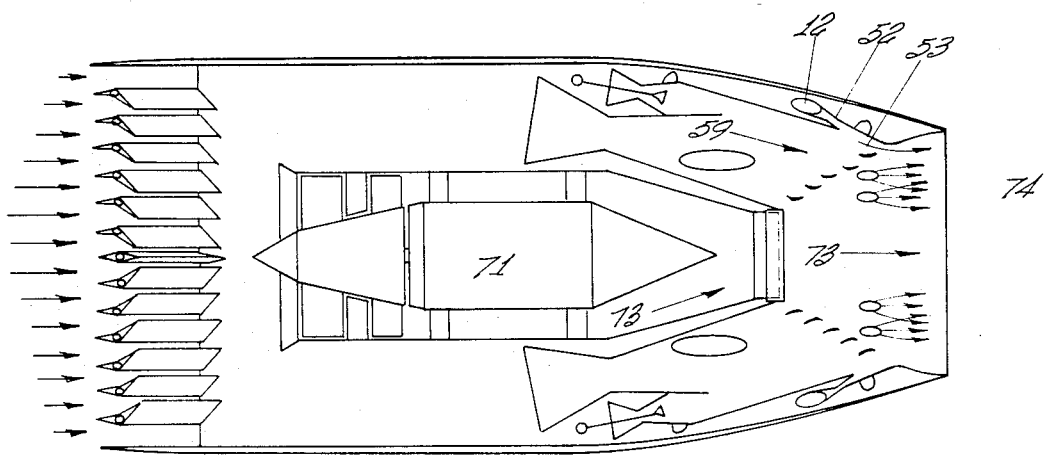

Ram-stream constriction air intake system for ramjet induction axialflow turbine is illustrated in FIGS. 20, 21 and 22. Rigidly fixed straight vane 17 is positioned on center-line of axial flow turbine, deflectable trailing section of vanes 18 and 19 are equally spaced and located on both sides of rigidly fixed straight vane and deflect the trailing section of vanes 19 bent toward the rigidly fixed straight vane 17. The stream shaping action on downstream of vanes at front of axialflow turbine during supersonic flight, the streams are constrained and controlled the stream properties, conversion of ram dynamic pressure to static pressure at the stream critical pressure on the front of axialflow turbine, this enhanced the power of axialflow turbine.

The power plant of an aircraft utilizing the liquid fuel prevaporization induction jet oval thrust nozzle, illustrated in FIGS. 1, 2, 3 and 4. Which is a round engine exit nozzle 2 transition to a vertically converging with horizontally diverging oval thrust nozzle 3. Fabricated with main airflow inducing nozzles 4, fuel injecting airflow inducing nozzles 5 fitted with conventional fuel injectors 6 and ignitors 7, combustion chambers 8, inductor vanes 9, liquid fuel prevaporization chambers 10 fitted with fuel injecting sprays 11, and pressurized vapor gas distributing manifolds 12 with discharge nozzles 13 fitted with ignitors 14. Air entering bellmouths of airflow inducing nozzles 4 and 5 are installed inside the ram constriction air inlet plenums 16 which are empty spaces in the engine pod on both sides of engine.

Throat downstream of airflow inducing nozzles are diverged and combine into combustion chambers 8, downstream end of combustion chambers are combined with minor axes span of round to oval transition tail pipe connected with parallel vertical equally spaced and downstreamwardly curved inductor vanes 9. Hollow spaces between envelope of plenum 15 and flat span of major axes transition walls comprises the open pressure vessel of vaporization boiling chambers 10 fitted with liquid fuel injecting sprays 11. The chambers are connected with prevaporized and pressurized gas distributing manifolds 12 with discharge nozzles 13. The discharge nozzles are downstreamwardly inclined and connected to minor axes areas of oval thrust nozzle, fitted with ignitors 14 at vaporized gas air mixing point. The openings of inclined discharge nozzles are adequate for slipflows of thrust stream and are positioned slightly upstream from throat of oval thrust nozzle for accommodation of ignition time span and to process the temperature reactants of after/back burning combustions at throat downstream of oval thrust nozzle. The vaporization boiling chambers are installed center portion of diverging major axes-engine exhaust stream zones of oval thrust nozzle, which results in the boiling chambers 10 inner walls gain high temperature heat transmited from the engine exhaust stream.

The pressure inside the vaporization boiling chambers are fluctuated by injecting rates of liquid fuel sprays: When the fuel injection is turned off, the boiling chambers are maintained the high temperature and negative pressure, cavitation is caused by dynamic pressure of oval thrust stream slipflows over the downstreamwardly inclined openings and induces the negative pressure inside the hollow chamber through the throats of inclined suck nozzles 13 and the distributing manifolds 12. When this occure the boiling chambers are maintained at high temperature and negative pressure, which means air mass inside the boiling chambers are maintained minimum for preventing occurences of explosion when starting the fuel injection and combustion can not occur in continuously inside the vaporization boiling chambers.

In order to turn-on the liquid fuel prevaporization and back burning; inject the liquid fuel spray into the high temperature-negative pressure of boiling chambers, the liquid fuel is vaporized which expand its volume and built up the local pressure inside the boiling chambers, so that thermal energy of engine exhaust converts to the dynamic of pressure inside the boiling chambers, and temperature reduction of engine jet stream after the engine exit nozzle and before the throat of oval thrust nozzle is to increases the nozzle efficiency and enhanced random velocity of thrust stream on the downstream of oval thrust nozzle. The dynamic of vaporized and pressurized gas expand and discharge to convergent-divergent inclined nozzles 13.

Purpose of the liquid fuel prevaporization and pressurization afterburners are to accomplish liquid fuel vaporization and pressurization before mixing into the airstream, accomplish reduction in time required for vaporization and expansion in the airstream. Preceeding expansion/combustion in the short span of airstream and explosion in the downstream throat of oval thrust nozzle, and increasing the thermal head/dynamic pressure of oval thrust rarefied stream. Exceeded injection of flamable vaporized gas flow into the throat of oval thrust nozzle, this occurrences the combustion will continuously to downstream of nozzle exit and preceeding the back-fire on the surrouding airstream intertion which is oblique shock stream induced from forward speeding wege of wing. This actuation of oval thrust nozzle produces a real high temperature thrust stream such of the rocket engine nozzle, thus means of a liquid fuel prevaporization and back burning induction jet oval thrust nozzle is achieved, which is power source and the principal of induction aerodynamic system of an aircraft.

The induction jet power plant is illustrated in FIGS. 5 and 6, prefabricated liquid fuel prevaporization and back burning induction jet oval thrust nozzle is slip fits on the round exit nozzle 2 of conventional air breathing engine 1, enveloped with ram constriction air inlet plenum 15, 16, 17, 18 and 19.

Installation of power plant is illustrated in FIGS. 8, 9, 10 and 11, installed forward of aerodynamic generating channel, located in forward and above the vacuum cell induction lift wing 25, and below the recycling air inductor vanes 31. The transition tail pipe of oval thrust nozzle is so that thier major axes are horizontal and thier minor axes are vertical. Which is the engine jet stream passes through the engine exit nozzle 2 then through the transition tail pipe, where the stream is constrained vertically the converging jet stream converts to adverse pressure on the direction of flow and this adverse pressure reconverts to velocity head in the direction of flowing on diverging region of the oval thrust transition tail pipe.

The function of converging with diverging transition tail pipe is to shape the stream and reduce turbulence in the round vorticity engine exhaust stream. The stream is constrained on the converging zones and the stream geometric contours are subject to stream separation at horizontal divergent region. Thus the stream under expands in direction of flow and conversion to velocity on the diverging zones are achieved through adverse pressure from converging portion of tail pipe. Conversion of velocity is achieved by effect of the thermal head on the diverging contours of transition tail pipe. It is proportional to the contours of nozzle and the conversion of thermal head to velocity.

The stream shaping action inside the transition tail pipe develops the momentum equilibrium-freedom balancing of stream dynamic pressure as developed by the induction airflow inducing nozzles and inductor vanes.

The stream shaping action will vertically constrained laminated and gain adverse pressure in the direction of flow on the converging zones and under expanded to direction of flow on the diverging zones. Thus stimulating random velocity in the diverging zones of oval thrust transition tail pipe.

The random velocity of under expanding airstream contours will slipflows over the downstreamwardly curved inductor vanes 9 and generates cavitation at the intermediate area of the inductor vanes. This cumulative cavitation is equal to the pulling force occurring beyond the thermal stream dynamic pressure in the diverging stream contours. This pulling force of the stream dynamic induces the induction airflow from low velocity air plenums through the airflow inducing nozzles. The results of induction airflow will balance the pulling pressure of the thermal stream dynamic, which results from the freedom balancing of stream shaping action by momentum equilibrium of stream dynamic pressure on the induction jet oval thrust transition tail pipe.

Figure 12:
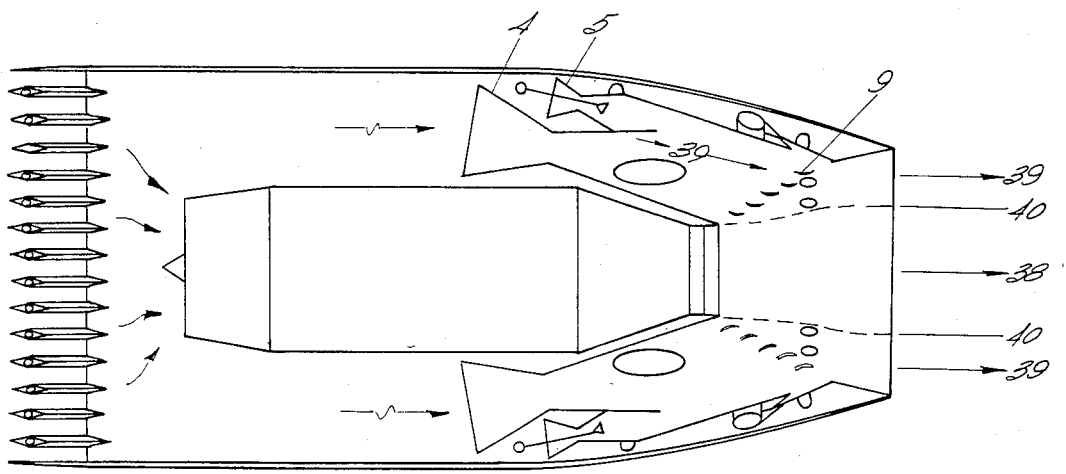
Figure 16:
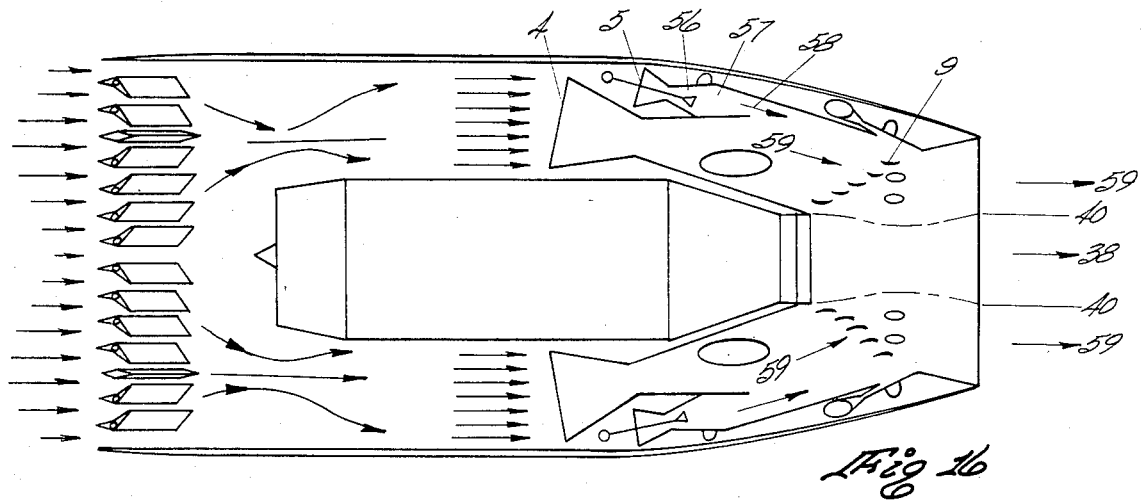
Figure 17:
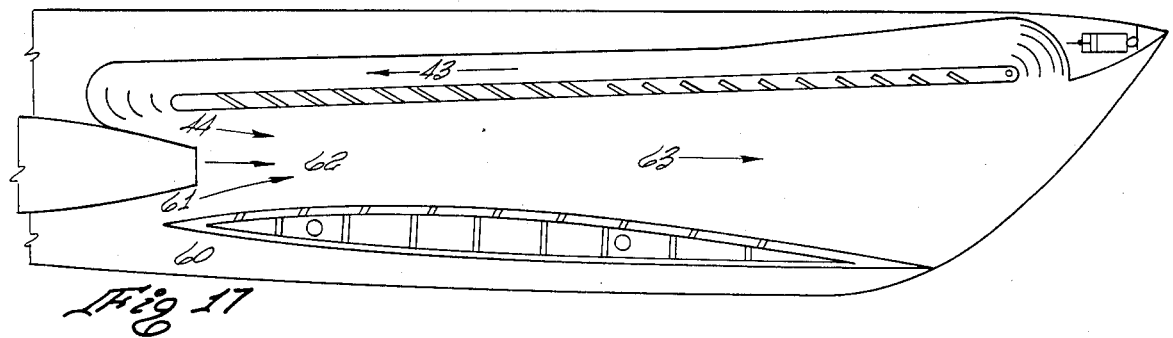

The inductor vanes 9 are so positioned as to be near the boundary layers which surround the under expansion region of the engine exhaust stream inside the diverging area of oval transition tail pipe. FIGS. 12 and 16 shows, the boundary layers 40 and 40' which exists at the interface of the turbojet stream 38 and the induction airstream 39 or ramjets streams 59.

The position of boundary layers will shift in response to changes in the speed of flight. FIG. 12 shows the boundary layers 40 which are exists near the inductor vanes 9, when the aircraft is in stationary or during low speed flight. FIG. 16 shows the boundary layers 40' which are shifted toward to center-line of engine jet stream 38, when the aircraft is in supersonic flight.

The processing of the thrust stream inside the induction jet oval thrust transition tail pipe's results in a cylindrical vortex engine jet stream through the round section of engine exit nozzle 2 then through the transition tail pipe, the strong random velocity of engine exhaust stream will be constrained with adverse pressure gradient at vertical convergence, the stream will be underexpand in the direction of flow in the region of horizontal divergence and the diverging contours are subject to the stream separation, illustrated in FIG. 12, the under expanding engine jet stream 38 slipflows over the inductor vanes 9 and generates the induction airstreams 39 through the airflow inducing nozzles 4 and 5, resulting in induction airflow reduces the separation of engine exhaust stream at diverging contours of tail pipe and increases the volume of oval thrust stream, and drastic reduction of stream separation at horizontal divergent, and the vertical constriction of stream-strain action results in a vertical converging airstream shaping action take over to nearly dies-out the stream rotation vorticity and velocity distribution fully develops in a nearly uniform profile, which means there is a laminated high volume thrust stream in the oval thrust nozzle, which achieved by the induction jet oval thrust nozzle fitted on the conventional air breathing engine.

The prime force behind induction air flowing is turbojet stream thus achieved a means of turbo-induction jet air breathing engine, processed by the principal of induction which is freedom balancing beyond-dynamic pressure of thermal thrust stream on the diverging contours of transition tail pipe. This achieves the laminary high volume rarefied flow used for production of aerodynamic forces.

These streams shaping actions are processed in the local component of induction jet oval thrust transition tail pipe before it passes through the exit of oval thrust nozzle. This causes reduced vorticity turbulences of engine exhaust stream laminary by the transition tail pipe's converging with diverging shaping action with induction airflow. Purpose of the induction jet oval thrust transition tail pipe is to induces high volume air breathing and reduce turbulence in the jet thrust rarefied and flow through the aerodynamic generating channel over the vacuum cell induction lift wing.

Figure 13:
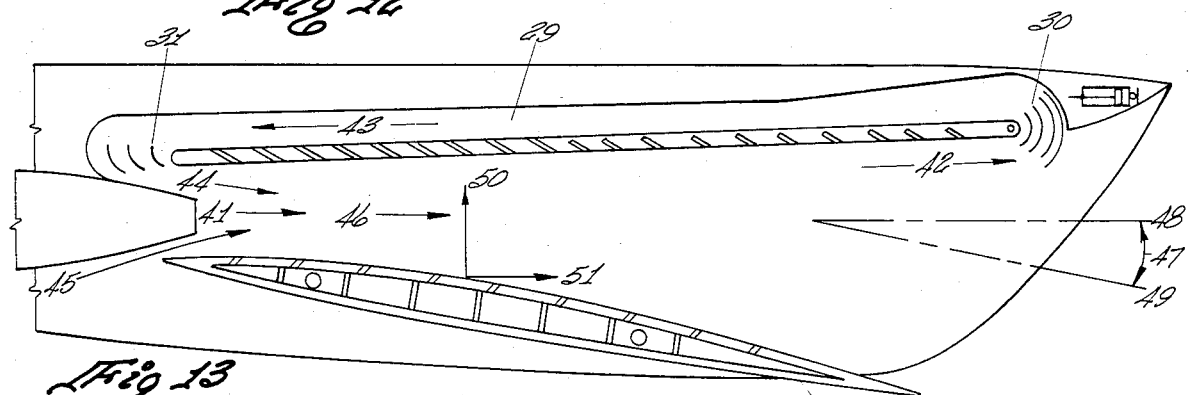

The turbo-induction jet air breathing oval thrust stream in the aerodynamic generating channel is illustrated in FIG. 13, the dynamic pressure of oval thrust stream 41 induces airstreams of recycles and surrounding, which is the recycles airstream 44 is the thrust peripheral flow diverts into the forward upper portion of channel through the diverting flow 42 turning vanes 30, reverse flow 43 duct 29 and recycling air inductor vanes 31, and the surrounding airstream 45 is induced at forward lower portion of channel through the slot gap between flat span of oval thrust nozzle and leading edge of wing. These airstreams are increases airstream volume at forward section of aerodynamic generating channel and merged with induction jet thrust stream, this increased airstream 46 flowing through the aerodynamic generating channel over the vacuum cell induction lift wing and generates the aerodynamic lift 50 and drag 51 forces, the drag force on the wing counterbalances the forward thrust of engine idling operation during stationary.

Figure 14:
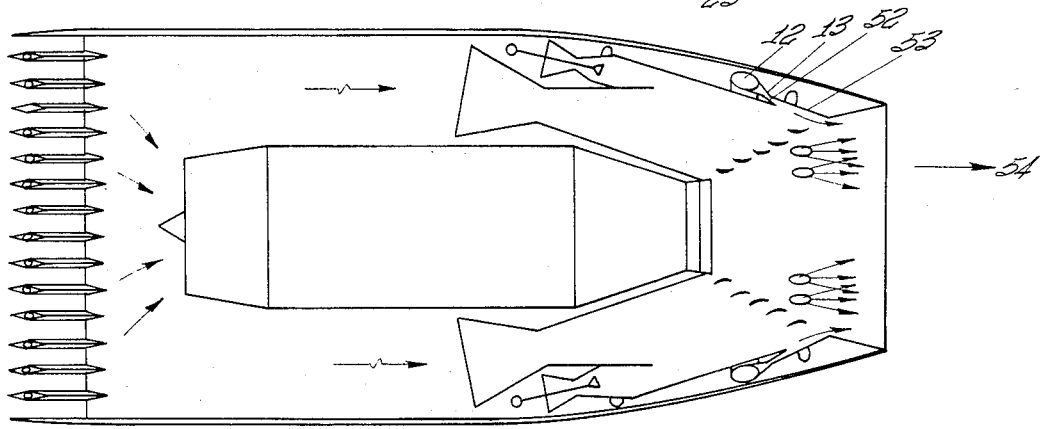

The processing of turbo-induction jet air breathing rocket oval thrust stream is illustrated in FIG. 14, during hovering operation or forward acceleration with turned on liquid fuel injecting sprays in the vaporization chambers, prevaporized and pressurized gas stream 52 flowing into the induction air stream 39 zones of oval thrust nozzle through the vaporized gas distributing manifolds 12 and discharge nozzles 13, which means the turbo-induction jet air breathing oval thrust stream receives the prevaporized liquid fuel, ignition of combustible air mixture 53 which produced flame thrust stream 54 at downstream of oval thrust nozzle such as high thermal rocket thrust stream, which is creating a turbo-induction jet air breathing rocket thrust engine, this is accomplished by a liquid fuel prevaporization and back burning induction jet oval thrust nozzle fits onto the conventional air breathing engine.

Figure 15:
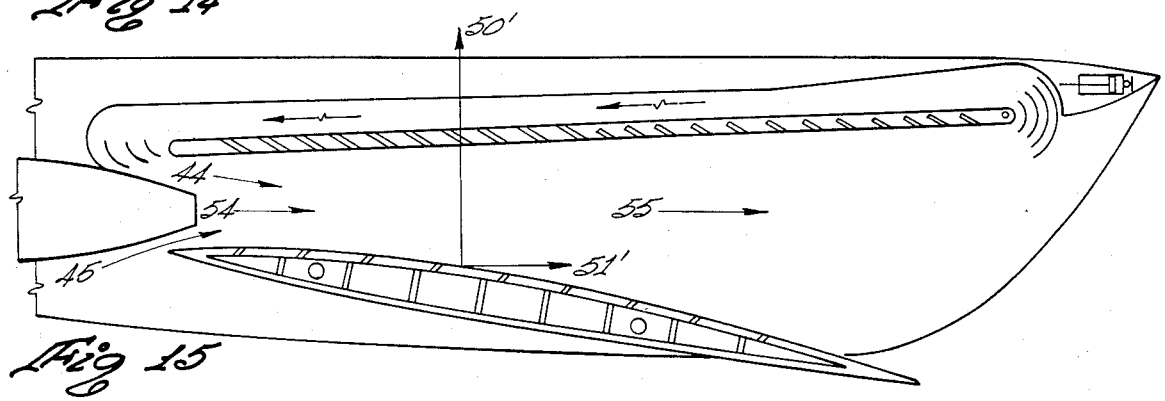

The hovering capacity is generated with the turbo-induction jet air breathing rocket oval thrust stream flow through the diverging contours of aerodynamic generating channel, illustrated in FIG. 15, the dynamic pressure of oval thrust flame stream 54 induces recycles and surrounding air streams, the recycles airstream 44 is the thrust peripheral flows diverts into the forward and upper portion of channel through the turning vanes 30, reverse flow duct 29 and recycling air inductor vanes 31, and the surrounding airstream 45 at the forward and lower portion of channel through the slot gap between the flat span of oval thrust nozzle and the leading edge of wing. These streams are increases the volume of airstream in the channel and merged with flame stream of turbo-induction jet air breathing rocket thrust, merging of these streams are produces the expanding combustion thrust stream and flow through the diverging contours of aerodynamic generating channel over the vacuum cell induction lift wing. The dynamic pressure of expanding combustion thrust stream 55 slipflows over the downstreamwardly inclined slot openings of vacuum cell wing, this stream action on the wing induces the vacuums in internal cells of wing which creates aerodynamic lift and drag forces on the wing, these forces are corresponding with the incidence angle 47 of wing which angle from center-line of thrust stream and chord line of wing. These forces generated on the wing results in the drag force 51' counteract the forward thrust of engine and stabilize the horizontal moment of airframe, and the lift force 50' balances the weight of aircraft where hovering capacity is producted which is accomplished by the turbo-induction jet air breathing rocket thrust aerodynamic generating channel. The aircraft VTOL. hovering manoeuvers are achieved by the turbo-induction jet air breathing rocket thrust aerodynamic generating channel.

The processing of turbo-ram induction jet air breathing oval thrust stream is illustrated in FIG. 16, during supersonic flight, ram constriction air inlet plenums 16 are gain ram-static pressure and ram-stream flows through the airflow inducing nozzles 4 and 5, turned on fuel injection 56 at downstream of fuel injecting airflow inducing nozzles 5, the combustible mixture 57 is ignited it produces flame stream 58 and flow into combine with downstreams of main airflow inducing nozzle 4 as it enters combustion chambers, expanding combustion streams produces ramjets through the diverging contours of combustion chambers and expansion of ramjets streams 59 combined with turbojet stream 38 at oval thrust nozzle, which means an oval thrust nozzle handling the turbojet stream and the ramjets streams, thus creating a turbo-ram induction jet air breathing engine. Processed by free stream constriction of air intake which is oblique-streams flow tangentially toward interaction together with constriction to critical pressure and form the free stream throat inside the low velocity air plenums, resulting in first constrained then expansion of ram-airstream which controls the ram pressure on air intake bellmouths of ram-airflow inducing nozzles which are ramjet components of the induction jet oval thrust nozzle.

Figure 18:
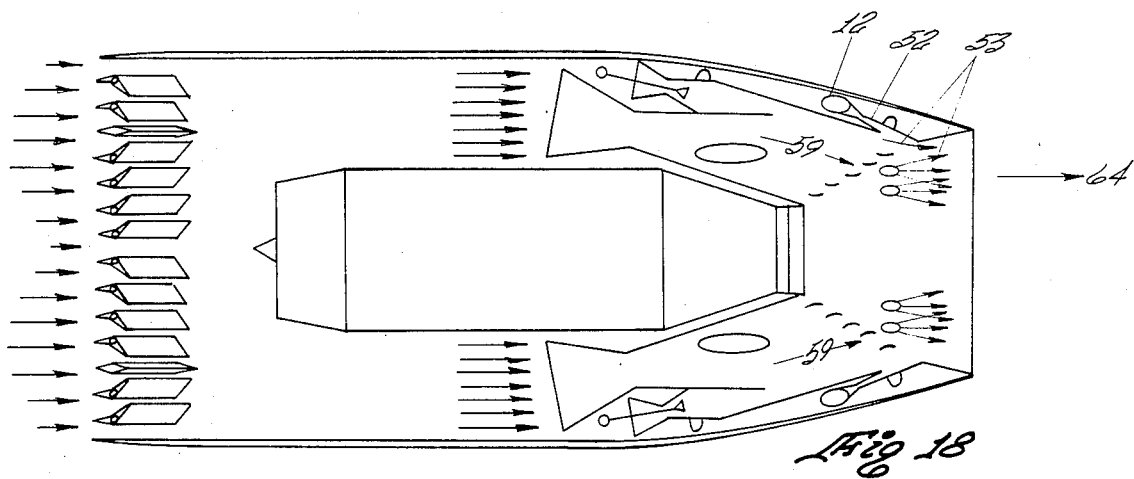

The processing of turbo-ram induction jet air breathing rocket oval thrust stream is illustrated in FIG. 18, during hypersonic flight, turned on fuel injecting sprays in the vaporization chambers, prevaporized and pressurized gas stream 52 discharge into the ramjets stream zones at oval thrust nozzle through the distributing manifolds and inclined discharge nozzles which means the turbo-ram induction jet air breathing stream receives the prevaporized liquid fuel, ignition of combustible mixture 53 it produces flame thrust stream 64 at downstream of oval thrust nozzle, which producted high thermal stream such as a rocket thrust stream, thus creating a turbo-ram induction air breathing rocket thrust engine.

Figure 19:
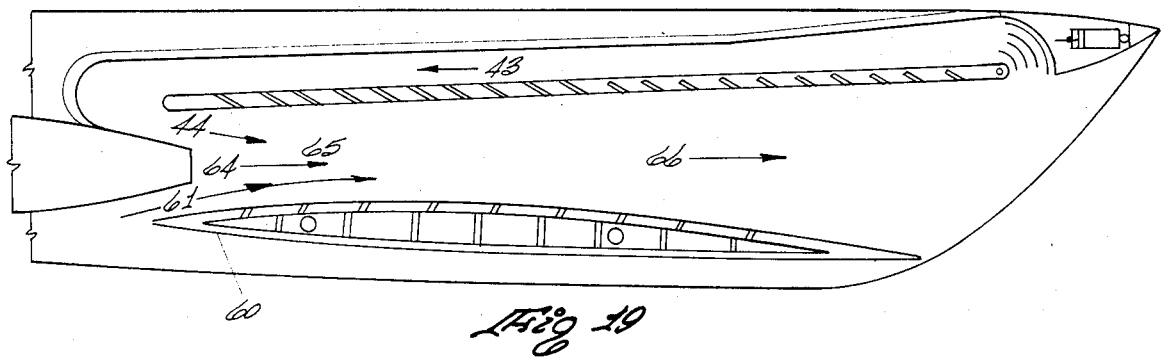

The hypersonic flight is generated with the turbo-ram induction jet air breathing rocket oval thrust stream flow through the diverging contours of aerodynamic generating channel, illustrated in FIG. 19, the dynamic pressure of back burning oval thrust stream induces the recycles airstream 44 which is thrust peripheral flow diverts into the forward and upper portin of channel through the reverse flow 43 duct and recycling air inductor vanes 31. Forward speeding leading edge 60 of wing induces the oblique shock airstream 61 and interact with the flame stream 64 of turbo-ram induction jet air breathing rocket thrust, these streams are tangentially constriction to critical pressure and form the high velocity free stream throat 65 in the forward section of channel, these streams are merged with produces the expanding combustion from downstream of free stream throat and expansion to hypersonic velocity of thrust stream 66 in the diverging contours of channel, thus creating a turbo-ram induction jet air breathing rocket aerodynamic thrust channel.

The ramjet induction axialflow turbine is achieved by the liquid fuel prevaporization and back burning induction jet oval thrust nozzle, illustrated in FIGS. 20, 21 and 22, during high speed flight. The liquid fuel prevaporization and back burning induction jet oval thrust nozzle slip fits on the exit pipe 67 of conventional axialflow turbine (rotators 68, 70 and stators 69) electric generator 71, the generator 71 is installed inside exhaust pipe 72 of axialflow turbine, and enveloped with ram constriction air inlet plenum.

Ram constriction multiple vanes 17, 18 and 19 assembly is fitted on the inclined ram-air intake opening at forward of plenum pod on the front of axialflow turbine inlet diffuser. The forward speed of aircraft generates a velocity of ram-stream and passes through the deflectable multiple vanes 18 and 19 of air intake then flow into the plenum pod, the trailing section of multiple vanes 19 are deflect toward rigidly fixed straight vane 17 at center-line of axialflow turbine. The ram-stream on the multiple vanes are inflect the flow direction and tangentially constrained toward critical pressure on front of the axialflow turbine inlet diffuser. The critical ram pressure flow impinges on the axialflow turbine blades 68 and 70, rotating the turbine wheels.

The ram static pressure gain on the low velocity air plenums 16 and processing of ramjets in the ram-airflow inducing nozzles are described in previously. Expanding ramjets streams 59 thrust flow through the inductor vanes 9 and induces the negative pressure stream 73 inside the exhaust pipe of turbine, resulting in increased pressure differential on the turbine inlet and outlet, this enhanced power of ram-axialflow turbine and operates such of electric generator, thus achieved a means of ramjet-induction axialflow turbine, which is accomplished by the liquid fuel prevaporization and back burning induction jet oval thrust nozzle fitted onto the conventional axialflow turbine with enveloped ram constriction air inlet plenum and installed ram stream zone of airframe.

The liquid fuel prevaporization and back burning induction jet oval thrust nozzle is principal development in new method of the induction lift aircraft.

I claim:

1. A liquid fuel prevaporization and backburning induction jet thrust transition tail pipe adapted to be affixed to a turbojet engine comprising means defining a primary air inlet adapted to be affixed to a said turbojet engine and defining a diverging area in the transition tailpipe located downstream therefrom, said diverging area defining means including means for forming a vertically converging and horizontally diverging thrust nozzle, said diverging area defining means further including means defining a pair of air plenums each having an air inlet plenum which is adapted to direct an air/ram flow into a main airflow path defining means including means defining a bellmouth shaped inlet which communicates with an airflow inducing nozzle having a diverging downstream throat which terminates in a chamber having a downstream end opening, each of said airflow path chambers end openings defining a secondary inlet to said diverging area;

a plurality of parallel, vertically spaced curved inductor vanes positioned in the secondary inlets to the diverging area, said inductor vanes being adapted to deflect a secondary airflow passing through said bellmouth shaped airflow inducing nozzle, through said throat and chamber and through the secondary inlet into a path through said diverging area which is substantially directed towards said thrust nozzle;

means positioned adjacent the exit nozzle and ahead of said thrust nozzle for defining upper and lower liquid fuel prevaporization chambers adapted to the outstream surface of said diverging area of transition tail pipe, fuel injecting means which are positioned in the prevaporization chambers and means for defining vaporized gas outlets from said prevaporization chambers;

means defining a vaporized gas distributing manifold positioned around said diverging area and ahead of said horizontally diverging portion of said thrust nozzle, said distributing manifold defining means having a plurality of distributing orifices each having a convergent-divergent discharge nozzle which is adapted to direct a vaporized gas flow into and to be mixed with the airstream within said diverging area, each of said discharge nozzles having a discharge opening which is downstreamwardly inclined towards said thrust nozzle and adjacent a secondary inlet of said diverging area and responsive to the velocity of the airstream slipflow passing over the downstreamwardly inclined discharge openings producing a vacuum within the prevaporization chambers through the distributing manifold and the discharge nozzles wherein the vacuum has a pressure within the prevaporization chambers which is varied by the injection of liquid fuel into the prevaporization chambers by the injection means;

an ignitor positioned adjacent the discharge outlets at the vaporized gas-air mixing point which ignites the vaporized gas-air mixture at a location upstream from the thrust nozzle such that the ignited vaporized gas-air mixture combustion occurs in said thrust nozzle.

2. The liquid fuel prevaporization and backburning induction jet thrust transition tailpipe of claim 1 wherein said diverging area defining means includes means defining vertical side walls which are converging and horizontal side walls which are diverging to define an oval shaped thrust nozzle.

3. The liquid fuel prevaporization and backburning induction jet thrust transition tailpipe of claim 1 further comprising means located adjacent the main airflow inducing nozzles for defining a plurality of separate bellmouth shaped airflow inducing nozzles each having a throat which defines a diverging path to produce an induced airflow adapted to receive an injection of fuel;

a second plurality of fuel discharge nozzles being located in the throat downstream of said separate bellmouth shaped air inlets to produce a vaporized and combustible fuel-air mixture within the chamber;

a second plurality of ignitors located adjacent said second plurality of fuel discharge nozzles for igniting said fuel-air mixture to produce a flame stream which travels downstream through the chamber where it is combined with the induced airflow from the main airflow inducing nozzles and through the chamber end openings and secondary inlets where the combined airstreams are deflected by said inductor vanes toward said thrust nozzle producing laminar flow.

4. The liquid fuel prevaporization and backburning induction jet thrust transition tailpipe of claim 1 further comprising an aerodynamic generating channel located downstream of said thrust nozzle, said aerodynamic generating channel having an elongated lift-thrust generating channel defined by an inlet adjacent a said thrust nozzle which communicates with the reverse flow channel located in the upper portion thereof.

5. The liquid fuel prevaporization and backburning induction jet thrust transition tailpipe of claim 4 further comprising an aerodynamic lift wing having an airfoil including a leading edge and a trailing edge and having a top panel and an acoustically treated hollow interior, said airfoil including airtight partitions forming individual cells within said hollow interior and having inclined slots which extend from the top panel of said airfoil into each of the individual cells, said inclined slots extending at an angle from each of said individual cells toward the trailing edge of said airfoil, said airfoil being adapted to be positioned within an aerodynamic generating channel in the lower portion thereof and spaced from the upper portion forming said elongated channel with the top panel of the airfoil being adapted to form a lower boundary of a said aerodynamic generating channel and forming an outlet for the main generating channel between the trailing edge of the airfoil and the rearward section of the upper portion forming the reverse flow channel and being adapted to define a slipflow thereacross from an airstream passing through a said aerodynamic generating channel;

support means operatively coupled to said airfoil adjacent the leading edge for enabling said airfoil to be rotated therearound to change the angle of incidence of the top panel to a said airstream passing thereacross; and pivoting means actuators operatively coupled to said airfoil adjacent the trailing edge for moving said airfoil trailing section relative to a said airstream by rotating said airfoil around said support means to change the angle of incidence of said top panel relative to a said airstream enabling a said airflow to generate a vacuum within said individual cells having a pressure which is determined by the angle of incidence of the top panel of the airfoil to said airstream and by the shearing stress of a said airstream passing over said inclined slots in the top panel of said airfoil.

6. A liquid fuel prevaporization and backburning induction jet oval thrust transition tailpipe adapted to be affixed to a round exit nozzle of an airbreathing engine comprising an adaptor having an engine exit nozzle utilized as a primary air inlet of a transition tailpipe and a diverging area in the oval transition tailpipe which increases in cross sectional area and which defines by means of a contour having vertically convergent minor axes and horizontally diverging major axes an oval shaped thrust nozzle;

a pair of secondary inlets positioned on the minor axes zones on both sides of the diverging contours of said diverging area and main airflow path having induction airflow nozzles, each having a throat forming a diverging path and a plurality of fuel injecting airflow nozzles communicating with said throat, said fuel injecting airflow nozzles each having a bellmouth inlet positioned in an air plenum adapted to be located in a passageway located on the sides of a said air breathing engine in an air plenum-engine pod, said fuel injecting airflow nozzles including a diverging throat which provides an ignition chamber communicating with the throat downstream path of a main airflow inducing nozzle;

a combustion chamber located between the throat of said induction airflow nozzle and the secondary inlets;

a plurality of parallel, vertically spaced curved inductor vanes positioned in the secondary inlets to the diverging area, said inductor vanes being adapted to deflect a secondary airflow passing through said bellmouth shaped airflow inducing nozzles and said fuel injecting airflow nozzles through said combustion chamber and through the secondary inlet into a path through said diverging area which is substantially directed towards said thrust nozzle;

upper and lower liquid fuel prevaporization chambers adapted to the outstream surface of said diverging area of transition tailpipe positioned adjacent the engine exit nozzle and ahead of said thrust nozzle, said prevaporization chambers having gas outlets formed therein;

fuel injectors positioned in the prevaporization chambers;

a vaporized gas distributing manifold positioned around said diverging area and ahead of said horizontally diverging portion of said oval thrust nozzle, said distributing manifold having a plurality of distributing orifices each having a convergent-divergent discharge nozzle which is adapted to direct a vaporized gas flow into and to be mixed with the airstream within said diverging area, each of said discharge nozzles having a discharge opening which is downstreamwardly inclined towards said thrust nozzle and adjacent a secondary inlet of said diverging area and responsive to the velocity of the airstream slipflow passing over the downstreamwardly inclined discharge openings producing a vacuum within the prevaporization chambers through the distributing manifold and the discharge nozzles wherein the vacuum has a pressure within the prevaporization chambers which is varied by the injection of liquid fuel into the prevaporization chambers by the fuel injectors; and an ignitor positioned adjacent the discharge outlets at the vaporized gas-air mixing point which ignites the vaporized gas-air mixture at a location upstream from the thrust nozzle such that the ignited vaporized gas-air mixture combustion occurs in said thrust nozzle.

7. A method for producing a turbo-ram induction jet air breathing rocket thrust stream comprising the steps of producing from a liquid fuel prevaporization and backburning induction jet oval thrust transition tail pipe having a diverging area in the oval transition tailpipe terminating in a vertical converging and horizontal diverging oval shaped thrust nozzle and communicating with ram induction airflow inducing ram constriction air plenum having an inlet which has bellmouth shaped airflow inducing nozzles having a diverging downstream throat which communicates with said diverging area and a plurality of parallel, vertically spaced curved inductor vanes positioned in the ram-jet combustion chamber where the same communicates with said diverging area through secondary inlets to deflect the ramjet flows substantially directed towards said thrust nozzle and which have a plurality of prevaporized chambers which communicated through gas outlets and distributing manifolds having discharge gas nozzles which are located in said diverging area and inclined downstreamwardly towards said thrust nozzle and a plurality of ignitors located adjacent said discharge nozzles at vaporized gas-air mixing points within said diverging area a flame thrust stream which emanates from the thrust nozzle creating a high temperature, high velocity backburning thrust force;

directing said flame thrust stream through an aerodynamic generating channel located downstream of said thrust nozzle and recycling said flame thrust stream through an elongated main generating channel defined by an inlet and which communicates with the main generating channel and which has an upper portion defining a reverse flow channel and a lower portion and outlet of the main generating channel which is opened and is part of said main generating channel; and positioning a wing having a leading edge on the lower portion inlet of said aerodynamic generating channel with the leading edge of the wing located adjacent said thrust nozzle enabling the leading edge of the wing to generate an oblique ram-airstream and to interact with the flame thrust stream by constricting the same to a critical pressure at the forward section of the elongated main generating channel and which causes the high velocity momentum of the oblique ram-airstream to tangentially interact with the thermal energy of the flame thrust stream to diverge as it passes over the wing and merges with the recycling airstream at the forward section of elongated main generating channel producing an expanding combustion thrust stream which produces a thrust force.

8. The method of claim 7 further comprising the steps of injecting liquid fuel into and ignitating a ram airflow to produce a ram-jet flame thrust stream which is directed into the diverging area for further injection of fuel therein and ignition thereof to produce a hypersonic flame thrust stream.

* * * * *